Sept. 3, 1946.   P. M. WAITE   2,406,872
THROTTLE CONTROL
Filed Dec. 4, 1942   6 Sheets-Sheet 4
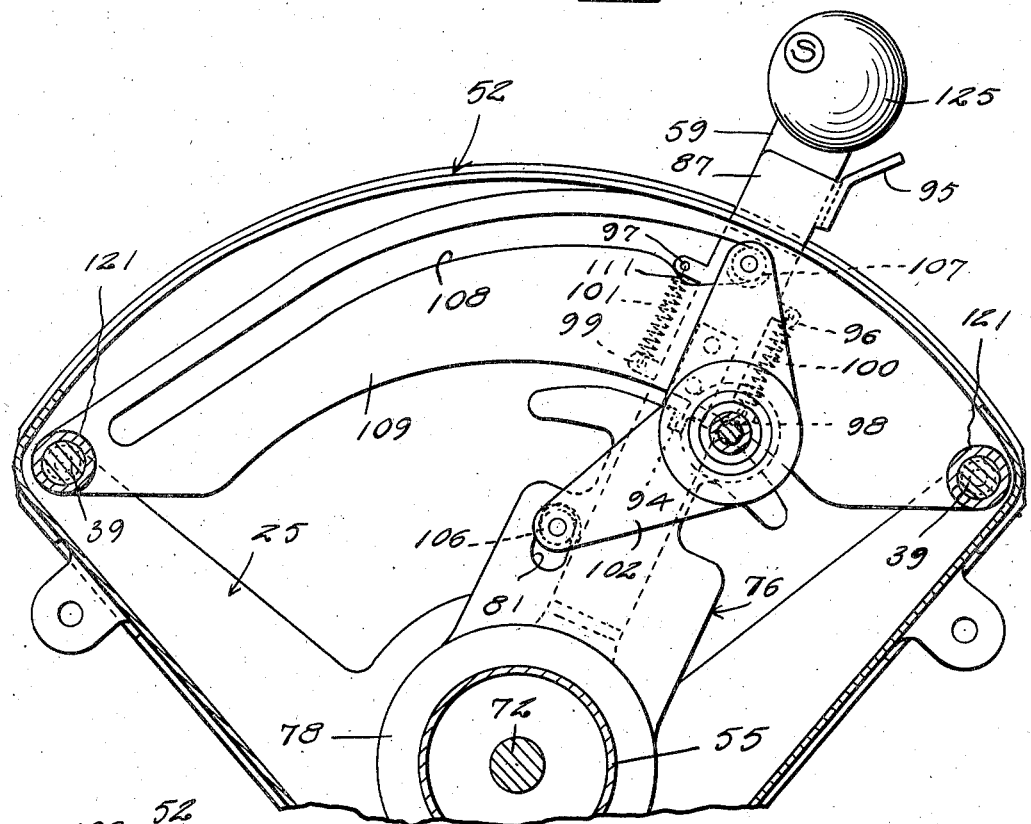
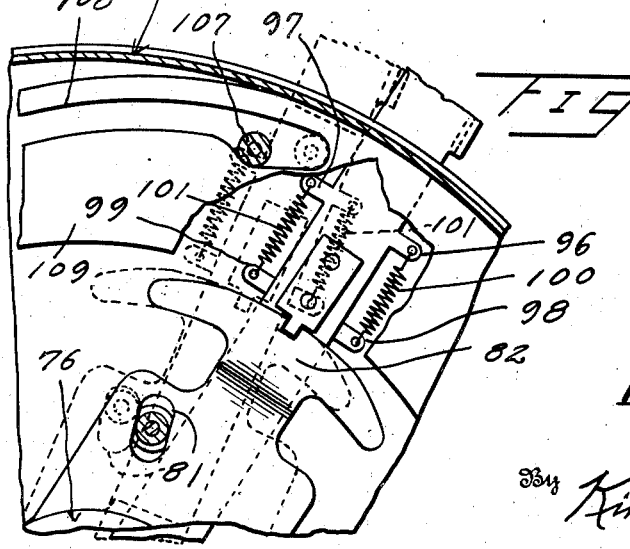
Inventor
P. M. Waite
By Kimmel & Crowell
Attorneys Sept. 3, 1946.   P. M. WAITE   2,406,872
THROTTLE CONTROL
Filed Dec. 4, 1942   6 Sheets-Sheet 5
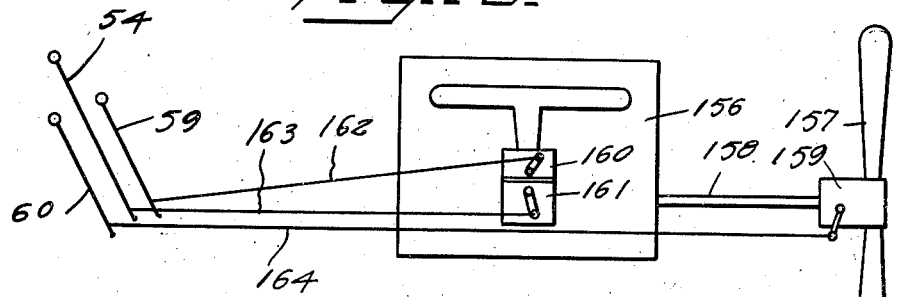
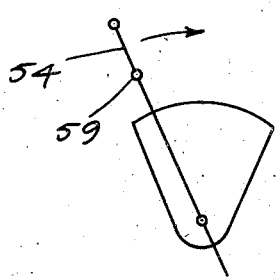 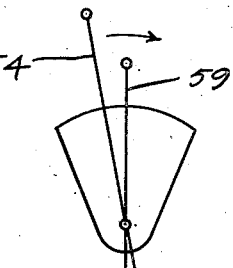 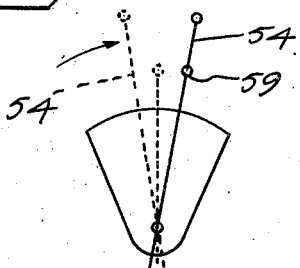
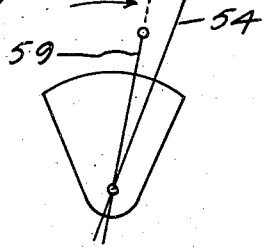 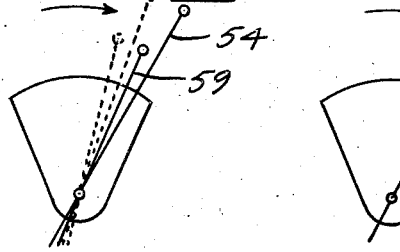 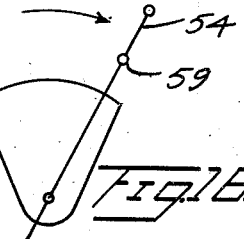
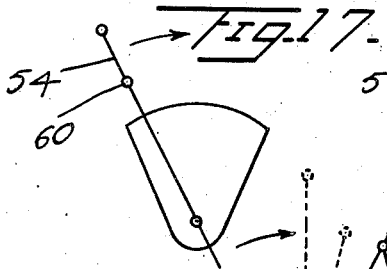 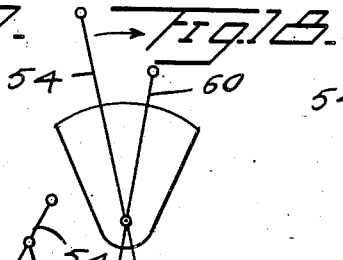 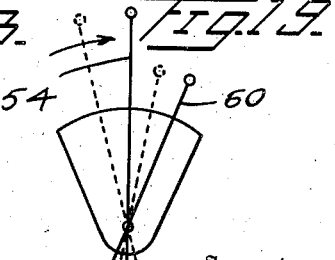
Inventor
P. M. Waite
By Kimmel & Crowell
Attorneys Sept. 3, 1946. P. M. WAITE 2,406,872
THROTTLE CONTROL
Filed Dec. 4, 1942 6 Sheets-Sheet 6
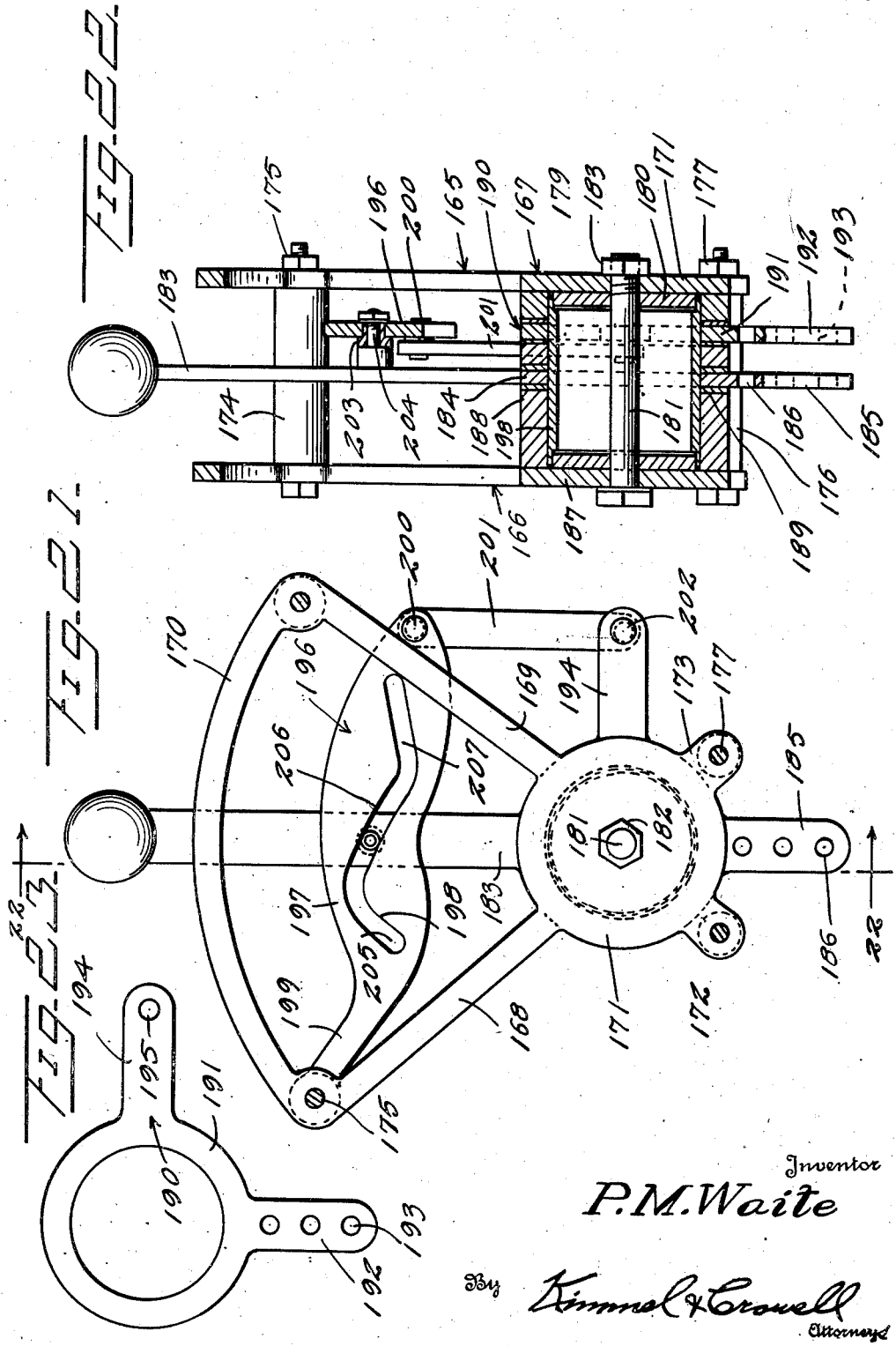
Inventor
P. M. Waite
By Kimmel & Crowell
Attorneys Patented Sept. 3, 1946

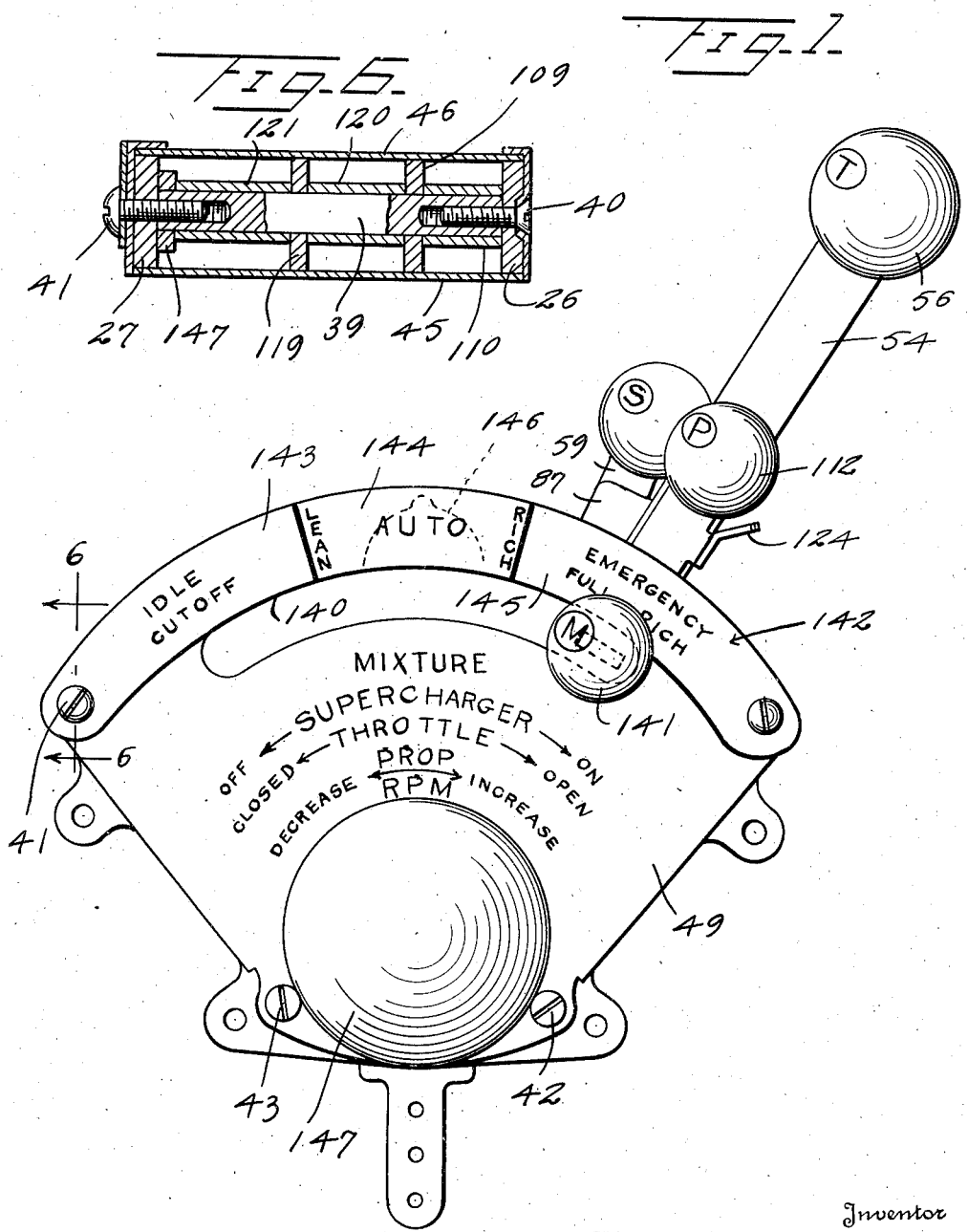

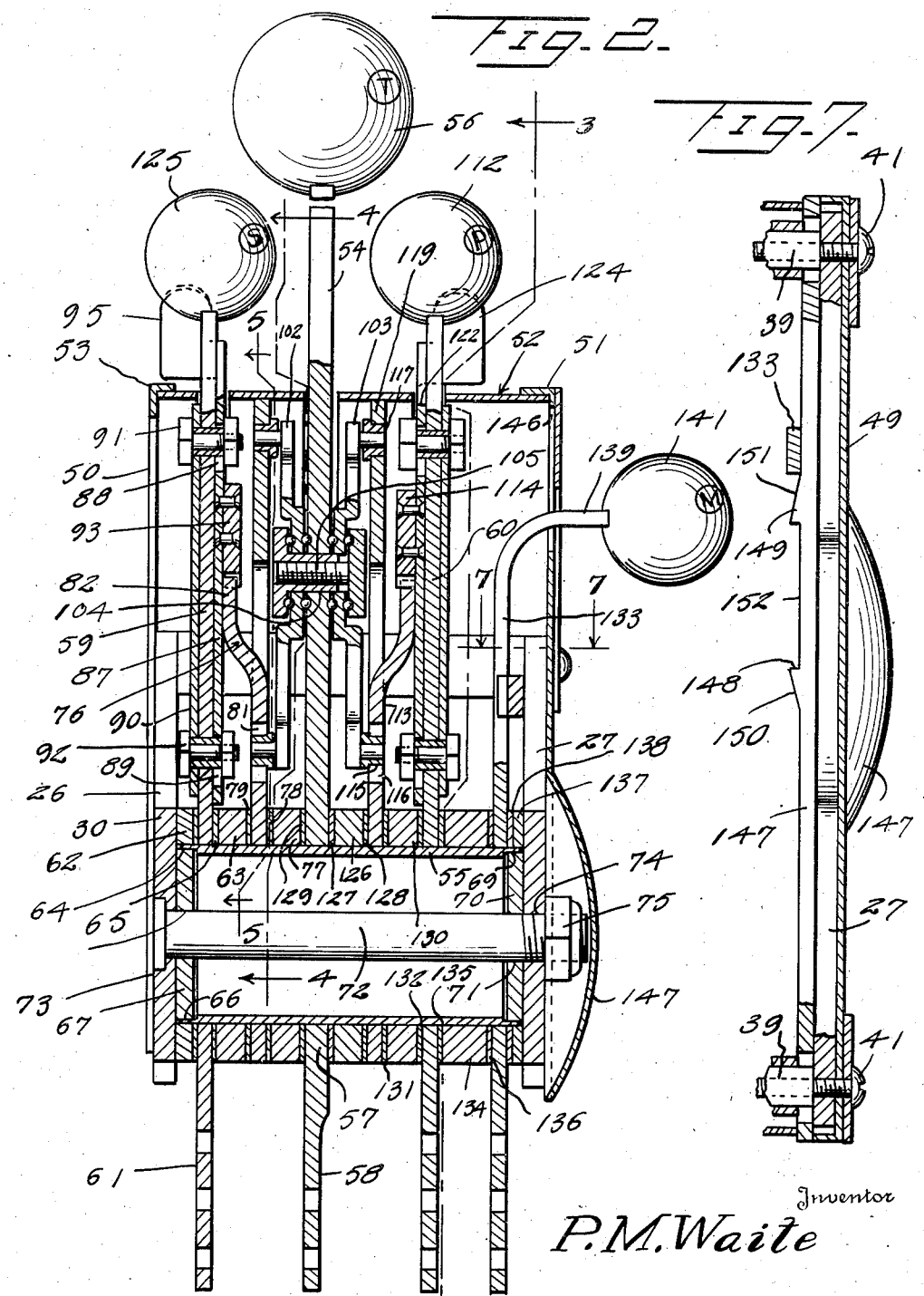

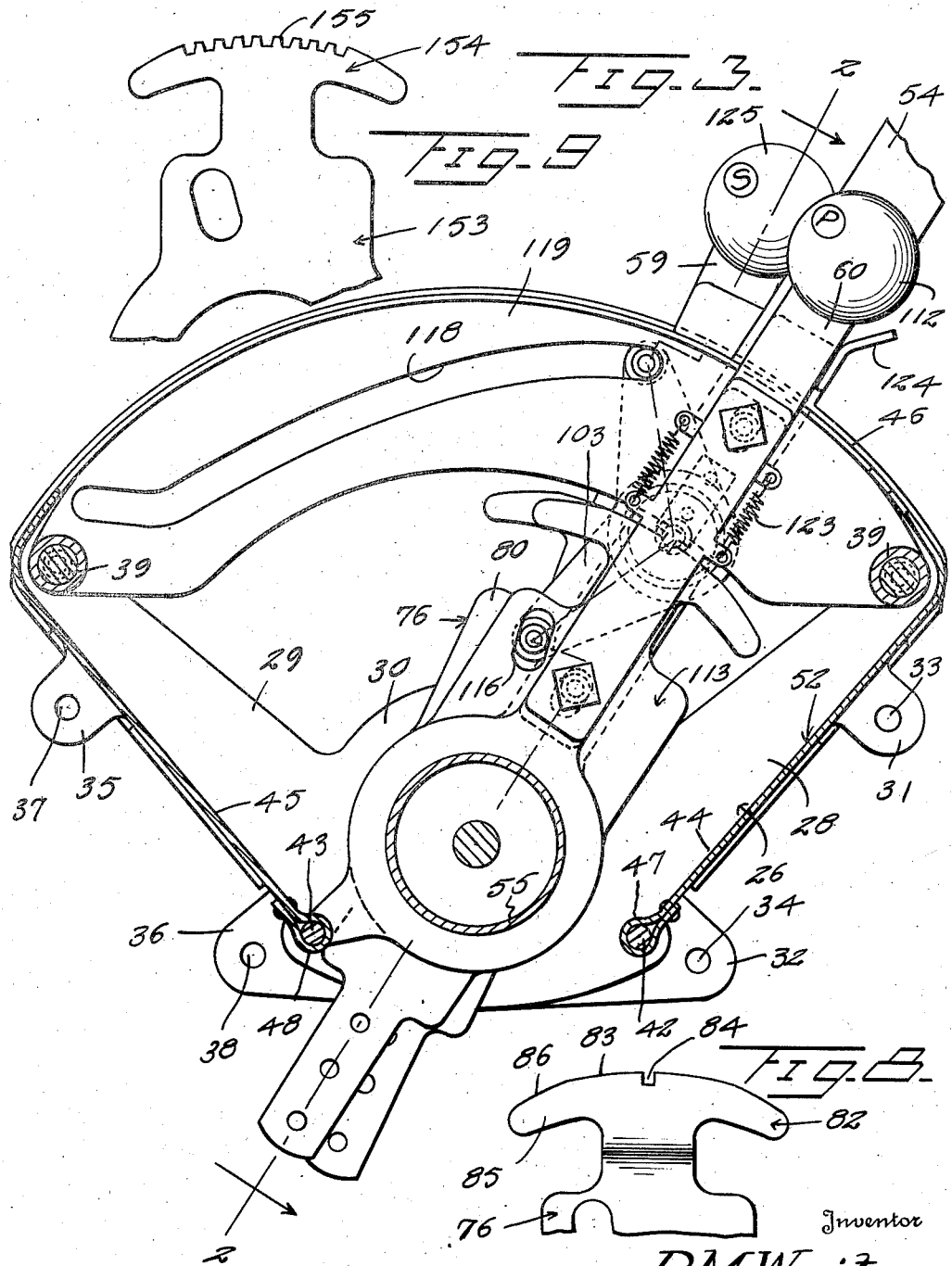

2,406,872

UNITED STATES PATENT OFFICE 2,406,872

THROTTLE CONTROL

Philip M. Waite, Corry, Pa.

Application December 4, 1942, Serial No. 467,882

4 Claims. (Cl. 74—471)

This invention relates to a control device for internal combustion engines and a variable pitch propeller operated by the engine, and is an improvement over the construction embodied in my copending application Serial Number 424,080, filed December 22, 1941.

An object of this invention is to provide a unitary control device which is adapted to regulate the normal throttle for the engine, to regulate the operation of the supercharger, and also to regulate the propeller pitch in proportion to the throttle and supercharger operation.

Another object of this invention is to provide in combination a movable throttle lever, a movable propeller pitch regulating lever, and means correlated with both levers for effecting accelerated movement of the propeller lever with respect to the throttle lever upon initial movement of the throttle lever in one direction, and subsequently effecting decelerated movement of the propeller lever with respect to the throttle lever during the latter portion of the movement of the latter lever in said one direction, the two levers having complete movement through equal length arcs.

A further object of this invention is to provide in combination a movable throttle lever, a movable supercharger lever, and means correlated with both levers for initially effecting accelerated movement of said supercharger lever with respect to said throttle lever during the initial movement of the latter for effecting decelerated movement of said supercharger lever upon additional movement of said throttle lever, for arresting movement of said supercharger lever upon subsequent movement of said throttle lever, for effecting movement of both levers at the same speed upon final movement of said throttle lever to the extreme position of the latter lever, the supercharger lever being normally rearward of the throttle lever when the latter is at its extreme position, but the supercharger lever being capable of independent movement from its normal rearward position with respect to the throttle lever, to a position laterally aligning with the throttle lever.

A further object of this invention is to provide a main rock lever, at least a pair of secondary levers and means correlated with the main and secondary levers for effecting differential movement between the main and secondary levers, and also differential movement between the several secondary levers.

The invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings:

Figure 1 is a detail front elevation of a control constructed according to an embodiment of this invention, Figure 2 is a vertical sectional view through the device, Figure 3 is a sectional view taken on the line 3—3 of Figure 2, Figure 4 is a fragmentary sectional view taken on the line 4—4 of Figure 2, Figure 5 is a fragmentary sectional view taken on the line 5—5 of Figure 2, Figure 6 is a sectional view taken on the line 6—6 of Figure 1

Figure 7 is a sectional view taken on the line 7—7 of Figure 2,

Figure 8 is a fragmentary side elevation of one of the secondary lever operators, Figure 9 is a fragmentary side elevation of a modified form of secondary lever operator, Figure 10 is a diagrammatic view showing the combination of the control with an internal combustion engine and a variable pitch propeller, Figures 11 to 16 inclusive are diagrammatic views showing the several positions of the main and one of the secondary levers, and Figures 17 to 20 inclusive are diagrammatic views showing the several positions of the main and the other of the secondary levers.

Figure 21 is a front elevation, partly in section, of a modified form of this invention;

Figure 22 is a fragmentary sectional view taken on the line 22—22 of Figure 21, and Figure 23 is a detail side elevation of the secondary lever used with the modification.

Referring to the drawings and first to Figures 1 to 8 inclusive, the numeral 25 designates generally a frame structure which includes a pair of inner and outer frame members 26 and 27 which are disposed in spaced apart relation. The frame member 26 includes a pair of upwardly divergent arms 28 and 29 which have formed integral with the lower or convergent ends thereof a bearing boss 30. The arm 28 is provided with a pair of outwardly extending ears 31 and 32 which are formed with openings 33 and 34 for receiving attaching bolts to secure the device on a suitable support. The arm 29 is provided with a pair of outwardly directed ears 35 and 36 having openings 37 and 38, respectively, for receiving attaching means to secure the device on a support.

The frame member 27 is of like construction to the frame member 26 with the exception that the attaching ears are omitted from the frame member 27. The outer divergent ends of the frame members 26 and 27 are connected together by means of a connecting bolt 39 within which fastening members 40 and 41 engage. The lower portions of the frame members 26 and 27 are also connected together by means of a pair of connecting bolts 42 and 43. A substantially sector-shaped housing formed of sheet metal is adapted to be disposed about the frame members 26 and 27 and includes a pair of upwardly divergent walls 44 and 45 which have formed integral with the upper ends thereof an arcuate wall 46. The lower end of the wall 44 is provided with a loop or tunnel 47 through which the bolt 42 is adapted to engage. The lower end of the wall 45 is formed with a loop or tunnel 48 through which the bolt 43 is adapted to engage.

A front wall or plate 49 of substantially sector shape is adapted to engage against the front side of the front frame member 27, and a rear cover 50 is adapted to engage against the rear side of the rear frame member 26. The cap or plate 49 is formed with a marginal flange 51 engaging about the housing 52 formed by the walls 44, 45 and 46 and the rear cover or plate 50 is formed with a marginal flange 53 engaging about the rear marginal portion of the housing 52. The bolts 40 and 41 provide a means for securing the plates 49 and 50, respectively, and the bolts 42 and 43 provide means for securing the lower portion of the plate 44 on the frame structure.

A main throttle lever 54 is rockably disposed within the frame structure 25 being rockably mounted on a tubular bearing member 55 which is disposed between the two frame members 26 and 27. The lever 54 is provided at its upper end with a knob 56 and is provided at its lower portion with a bearing 57 rockably engaging the periphery of the sleeve or cylindrical bearing member 55. An extension 58 extends downwardly from the bearing portion 57 of the lever 54 and provides a means for attaching the connections between the lever 54 and the throttle lever of the carburetor.

A pair of secondary levers 59 and 60 are rockably mounted on the cylindrical bearing member 55 on opposite sides of the main lever 54 and spaced laterally from the lever 54. The lever 59 is formed with a lower extension 61 for attaching connections to the structure operated by the lever 59, and in the present instance, the lever 59 is connected with the supercharger structure. A spacing washer 62 is interposed between the lever 59 and the forward side of the rear frame member 26, and a second spacing member 63 is disposed on the forward side of the lever 59. A pair of friction washers 64 and 65 are interposed between the spacing washers 62 and 63 and the adjacent sides of the lever 59. The bearing member 55 has mounted in an annular channel 66 thereof a disc-shaped plate 67 formed with a central opening 68 and the opposite or outer end of the bearing member 55 also has mounted in an annular channel 69 an outer disc-shaped plate 70. The plate 70 has a central opening 71 and a bolt 72 is extended through the openings 68 and 71 in the disc members 67 and 70, respectively, and is also extended through openings 73 and 74 which are formed in the frame members 26 and 27. A nut 75 is threaded onto the outer end of the bolt 72 and provides a means whereby the desired friction may be applied to the levers 54, 59 and 60 to thereby hold these levers in their manually adjusted position with respect to the bearing member 55.

In order to provide a means whereby the secondary lever 59 may have differential movement with the movement of the main lever 54, I have provided a secondary lever operator 76 which is rockably mounted on the bearing member 55. The lower portion of the operator 76 is spaced from the rear side of the main lever 54 by means of a spacing ring or washer 77 and friction washers 78 and 79 are disposed on opposite sides of the operator 76. The washer 78 is interposed between the ring or spacer 77 and the forward side of the operator 76 whereas the washer 79 is interposed between the spacing ring 63 and the rear side of the operator 76. The operator 76 is formed with a radially and outwardly extending body 80 which has formed therein an elongated slot 81, the long axis of the slot 81 being radial to the axial center of the bearing member 55. The operator 76 also includes a rearwardly offset head 82, the details of which are shown in Figure 8.

The head 82 is provided with an arcuate outer edge portion 83 having a notch or keeper 84 therein. The head 82 also includes oppositely extending wings 85, the outer edge portions 86 of which provide a cam surface, the purpose for which will be hereinafter described. The secondary lever 59 has mounted on the forward side thereof an elongated plate 87 which is formed with upper and lower elongated openings 88 and 89. A rear reinforcing plate 90 engages against the rear side of the secondary lever 59 and the two plates 87 and 90 are secured to the opposite faces of the lever 59 by upper and lower bolts or fastening members 91 and 92. The plate 87 constitutes a latching plate and has secured to the forward side thereof a block 93 which is formed at its lower end with a pawl or tooth 94 engageable in the notch 84. The plate 87 at its upper end is formed with a finger engaging member 95 and is also provided with a pair of oppositely extending ears 96 and 97. The rear plate 90 is formed with a pair of ears 98 and 99 and a pair of springs 100 and 101 are connected to the ears of the two plates 87 and 90 and constantly urge the forward latching plate 87 inwardly to normally maintain the bolt or tooth 94 in the keeper or notch 84.

The main lever 54 has rockably mounted thereon a pair of bell cranks 102 and 103, the bell cranks being mounted on pivot means comprising a headed sleeve 104 which is extended through the lever 54 and a headed screw 105 which is threaded into the sleeve 104. Anti-friction balls of conventional construction are interposed between the heads of the sleeve 104, the bolt 105 and the adjacent sides of the bell cranks 102 and 103 and the adjacent sides of the lever 54. The bell crank 102 has rotatably mounted on one arm thereof a roller 106 which engages in the elongated opening 81. The other arm of the bell crank 102 has rotatably mounted thereon a roller 107 which engages in a cam track 108 which is formed in a longitudinally arcuate cam plate 109. The cam plate 109 is mounted in the opposite ends thereof on the bolts 39, and preferably, a spacing sleeve 110 is interposed between the rear side of the cam plate 109 and the rear frame member 26.

The cam track 108 adjacent one end thereof is formed with an enlarged track 111, the purpose for which will be hereinafter described.

This enlarged track portion 111 extends inwardly from the inner edge of the track 108 as shown in Figure 4. The cam track 108 provides a means whereby the bell crank 102 will be rocked on the pivotal support thereof carried by the main lever 54 when the main lever 54 is rocked or moved and the particular configuration of the track 108 will determine the particular differential movement effected between the main lever 54 and the secondary lever 59.

Referring now to Figures 11 to 16 inclusive, the differential movement provided between the two levers 54 and 59 are diagrammatically laid out. In Figure 11 the two levers are in their starting position and are laterally disposed in the same plane. In Figure 12 it will be noted that the secondary lever 59 is forwardly of the main lever 54, the cam track 108 being of such configuration as to provide for an accelerated movement of the secondary lever 59 for a portion of the movement of the main lever 54 from its initial starting position. In the present instance, the secondary lever 59 is accelerated through an arc greater than the arc of the movement of the main lever 54 and the secondary lever 59 is in substantially a vertical position. In Figure 13 it will be noted that further movement of the main lever 54 from the dotted line position to the full line position will provide for a decelerated movement of the secondary lever 59, the secondary lever at this point being laterally in the same plane of the main lever 54. Further movement of the main lever 54, as shown in Figure 14, will provide for the independent movement of the main lever 54 with the secondary lever 59 stationary. Additional movement of the main lever 54 from the position shown in Figure 14 to the full line position shown in Figure 15 will provide for a substantially equal movement between the two levers 54 and 59. The position shown in Figure 15 is the final position of the main lever 54 and the full line position of lever 59 is the normal position of the secondary lever 59 when operated solely by the bell crank 102. If it is desired to move the secondary lever 59 forwardly an additional distance or in the same lateral plane as the main lever 54, the secondary lever 59 may be pushed forwardly, this independent movement of the secondary lever 59 being permitted by the downwardly offset cam track portion 111.

As the secondary lever 59 is independently moved forwardly from its normal forward position, the bell crank 102 will rock on the pivot thereof and the roller 107 will swing downwardly into the offset track portion 111. This is accomplished without unlatching the secondary lever 59 from the operator 76. The extreme forward position of the secondary lever 59 is shown in Figure 16 where the lever 59 is in the same lateral plane as the lever 54. The secondary lever 60 which is provided at its upper end with a knob 112 is adapted to have differential movement with respect to the main lever 54 under the swinging or rotary action of an operator 113 which is similar in every detail to the operator 76.

The lever 60 has slidable lengthwise thereof a dog or pawl 114 engageable in the notch of the operator 113 in the same manner as the engagement of the pawl 94 in the notch 84 of the head 82. The bell crank 103 has a roller 115 on one arm thereof which is disposed in an elongated opening 116 formed in the operator 113. The bell crank 103 also has a second roller 117 mounted on the other arm thereof which is movable in an elongated cam track 118 formed in a cam plate 119. The cam plate 119 is spaced from the cam plate 109 by a spacing sleeve 120 and is spaced from the forward frame member 27 by means of a spacing sleeve 121. The pawl 114 is fixed to a pawl carrier or elongated plate 122 which is spring-pressed by means of a pair of springs 123 to latching position. The upper end of the carrier 122 is provided with a finger engaging member 124 disposed in inwardly spaced relation with respect to the knob 124. The finger engaging member 95 is also inwardly spaced from a knob 125 which is mounted on the outer end of the secondary lever 59.

A spacing ring 126 is interposed between the operator 113 and the forward side of the lever 54 and anti-friction washers 127 and 128 are interposed between the spacer 126 and the lever 54 and the ring 126 and the operator 113 respectively. A friction ring 129 is interposed between the spacing ring 77 and the rear side of the lever 54. A spacing ring 130 is interposed between the operator 113 and the secondary lever 60, and a friction washer 131 is interposed between the rear side of the ring 130 and the forward side of the operator 113. A friction washer 132 is interposed between the forward side of the spacer 130 and the rear side of the secondary lever 60.

A supplemental lever 133 is rockably mounted on the bearing member 55 forwardly of the secondary lever 60 and is spaced from the secondary lever 60 by means of a spacing ring 134. A friction washer 135 is interposed between the rear side of the spacing ring 134 and the forward side of the lever 60 and a friction ring 136 is interposed between the forward side of the spacer 134 and the rear side of the supplemental lever 133. A forwardly disposed spacing ring 137 is interposed between the forward side of the lever 133 and the lower portion of the frame member 27. A friction washer 138 is interposed between the spacer 137 and the forward side of the lever 133. The lever 133 at its upper end is provided with a forwardly projecting or right angular portion 139 which projects through an elongated arcuate slot 140 formed in the cover plate 49. A knob 141 is mounted on the forwardly projecting portion 139 of the lever 133 and is disposed in forwardly spaced relation to the plate 49.

A longitudinally arcuate indicia bearing plate 142 is mounted on the forward side of the plate 49 adjacent the upper portion thereof and is provided with segments 143, 144 and 145 bearing indicia to indicate the action produced by the lever 133 in a selected one of its several positions. The plate 49 adjacent the upper portion thereof may be formed with a cutout 146, shown in dotted lines in Figure 1, through which the knob 141 may be extended at the time the cover plate 49 is applied to the frame structure. The plate 49 may be also provided with a forwardly offset lower portion 147 which extends about the forward end of the bolt 72 and the nut 75.

The lever 133 is movable rearwardly of an elongated latching bar 147 which is secured between the upwardly divergent arms of the forward frame member 27. The bar 147 is provided between the ends thereof with a pair of rearwardly extending lugs 148 and 149. The lugs 148 and 149 are provided with cam-shaped rear sides 150 and 151, respectively, so that when the lever 133 is rocked on the bearing member 55, the lever 133 will ride over the cam face 150 and be disposed in the space 152 between the two lugs 148 and 149. When the lever 133 is to be moved out of the space 142 it must be forcibly pushed inwardly from the upper end thereof, the lever 133 being of resilient material permitting it to be sprung rearwardly and when held in its rearward position, the lever 133 may then be rocked forwardly an additional distance, as for instance, to the position shown in Figure 7. When the lever 133 is riding over either one of the cam portions 150 and 151, the particular cam portion will forcibly bend the lever 133 until the lever drops on one side or the other of the cam portion. The lever 133 constitutes a mixture regulator for regulating the quantity of gasoline mixed with the air in the carburetor.

Referring now to Figure 9, there is disclosed a modified form of secondary lever operator 153 which is formed with a head 154 similar to the head 82 with the exception that the head 154 is formed with a plurality of notches 155. The notches 155 provide a means whereby a secondary lever may be manually adjusted to any selected position with respect to the main lever so that the particular secondary lever may be either forwardly or rearwardly of the main lever 54 in the starting positions of these levers. It will, of course, be understood that the selected adjustment of a secondary lever in its starting position will also effect the final position of the particular secondary lever produced by the cam tracks 108 and 118.

In Figures 17 to 20 inclusive, there are disclosed diagrammatically the several positions of the secondary lever 60 with respect to the main lever 54. In Figure 17, two levers 54 and 60 are at the starting position and are laterally in the same plane. The cam track 118 is so constructed as to provide for the initial accelerated movement of the secondary lever 60, the extent of this movement being shown in Figure 18. In this figure, it will be noted that the main lever 54 has moved only for a very small portion of the distance from its starting position, whereas the secondary lever has moved a considerable distance beyond the position of the main lever 54.

Additional forward movement of the main lever 54 will provide for equal movement of the secondary lever 60, as shown in Figure 19 in full lines, and further forward movement of the main lever 54 as shown in full lines in Figure 20 will provide for a decelerated movement for the lever 60, the latter lever lagging behind in its movement and finally terminating its forward movement at the forward terminal end of the movement of the main lever 54. The secondary lever 60 is adapted to be connected to a pitch changing mechanism, formed as part of a propeller structure, and the accelerated movement of the lever 60 is provided in order to actuate the pitch changing mechanism to the desired degree during the speeding up of the engine.

In Figure 10 there is disclosed an internal combustion engine 156 having a propeller 157 connected to the shaft 158 thereof, and a pitch changing mechanism 159 of conventional construction forms part of the propeller 157. A supercharger shown diagrammatically at 160 is connected with the engine 156, and a conventional carburetor 161 is also connected with the engine 156. The secondary lever 59 is connected by means of a suitable linkage 162 to the supercharger 160 and the main throttle lever 54 is connected by a linkage 163 to the main throttle of the carburetor 161. A linkage 164 connects the secondary propeller pitch adjusting lever 60 to the pitch changing mechanism 159.

In the use and operation of this control device, in the starting positions of the main lever 54 and the two secondary levers 59 and 60, all of these levers will be disposed at the extreme left position shown in Figures 11 and 17. Forward movement of the main lever 154 to the right or in a clockwise direction will cause initial accelerated movement of the secondary levers 59 and 60 as shown diagrammatically in Figures 12 and 18 for one phase or cycle of the main lever 54. Additional forward movement of the main lever 54 through another cycle will effect a decelerated movement of the secondary lever 59 and an equal movement of the lever 60. Further forward movement of the main lever 54 will be effected without movement of the secondary lever 59, as shown in Figure 14, and in this same movement, the secondary lever 60 will be on its deceleration cycle. Further movement of the lever 54 to its extreme right position, which is the position shown in Figure 15, will move the lever 59 at the same speed and through the same arc and in this arc of movement of the main lever 54, the secondary lever 60 will be on the final movement of the deceleration cycle, the latter lever being coplanar with the lever 54, as shown in Figure 20.

Lever 59 will be rearwardly of the lever 54, as shown in Figure 15 during the normal operation of the lever 54. However, if it is desired to move lever 59 forwardly an additional distance, this may be accomplished by manually rocking the lever 59 forwardly to the position shown in Figure 16. Where it is desired to move one of the secondary levers, as for instance, lever 59 independent of the main lever 54, this may be accomplished by unlatching the secondary lever 59 from the operator 76. If, as an example, the secondary lever 59 is moved forwardly from its starting position, the pawl 94 is pulled out of the notch 84 and the operator 76 remains stationary. When the main lever 54 is subsequently moved forwardly the pawl or dog 94 will ride over the cam face 86 of the head 82 and will drop into the notch 84 when the operator 76 is moved by means of the bell crank 102 to its normal position with respect to the secondary lever 59.

Further movement of the main lever 54 will move the secondary lever 59 therewith through the normal cycles of movement of the lever 59 remaining to the terminal end of the movement of the lever 54. It will be of course understood that the cam tracks 108 and 118 may be varied in their longitudinal configuration to provide for the desired cycles of movement of the secondary levers with respect to the main lever.

The control herein disclosed has been designed particularly for use in airplanes to provide for a single control to operate the main throttle, the supercharger and also the pitch changing mechanism of the propeller. With this control, the operator need only use one hand in effecting complete control of the operation of the engine and the other hand may be used for any other desired controls.

Referring now to Figures 21 to 23 inclusive, the numeral 165 designates generally a frame structure which includes a rear frame member 166 and a forward frame member 167. The frame members 166 and 167 are of like construction and each includes a pair of upwardly divergent arms 168 and 169 which are connected together at their upper divergent ends by means of an arcuate connecting bar 170. The divergent ends of the arms 168 and 169 are formed integral with a circular plate 171 which is provided with a pair of ears 172 and 173. The frame members 166 and 167 are held in spaced apart relation by upper spacing members 174 which are secured to the divergent ends of the arms 168 and 169 by fastening means 175. The lower portion of the frame 165 is held in spaced relation by means of spacer members 176 secured between the ears 172 and 173 by fastening members 177.

A cylindrical hub or pivot member 178 is disposed between the plates 171 and the opposite ends of the stationary pivot member 178 are provided with recesses 179 in which a plate 180 engages. A bolt 181 extends through the center of the end plates 171 and also through the plates 180 and is provided at one end thereof with a nut 182 so that the plates 180 may be pushed inwardly to apply the desired friction on the respective levers which are pivotally mounted on the stationary cylindrical member 178.

A main lever 183 which is provided with a ring-shaped hub 184 is rockably mounted on the cylindrical member 178 and is provided at its lower end with an extension 185 formed with a plurality of openings 186 to which suitable connections may be secured to provide for the desired operation of the parts connected with the main lever 183. The lever 183 is disposed in forwardly spaced relation to the rear plate 187 formed by the rear frame member 166 by means of one or more cylindrical spacer members 188. The spacer member or members 188 are mounted on the stationary member 178 and a friction washer 189 is interposed between the spacer member 188 and the rear side of the hub 184 of the main lever 183.

A secondary lever generally designated as 190 is rockably mounted on the stationary member 178 forwardly of the main lever 183. The secondary lever 190 as shown in Figure 23 is constructed in the form of a bell crank, being provided with a ring-shaped hub 191 which rockably engages the stationary member 178 and the hub 191 has a radially disposed arm 192 provided with openings 193 for receiving conections to the desired parts operated by the lever 190. The lever 190 also includes an arm 194 disposed at right angles to the arm 192 and provided adjacent the outer end portion thereof with an opening 195. The secondary lever 190 is adapted to be rocked with the rocking or swinging movement of the main lever 183 by means of a pivoted cam element 196. The cam element 196 includes a cam plate 197 which is formed with a cam track 198. The cam plate 197 is provided with an elongated extension or arm 199 which is pivotally mounted on one of the securing members or bolts 175. The cam plate 197 at the opposite end thereof has pivotally secured thereto as at 200 the upper end of a link 201. The lower end of the link 201 is pivotally secured as at 202 to the arm 194, the pivot member 202 engaging in the opening 195.

The main lever 183 has mounted on the forward side thereof a roller 203 which movably engages in the cam track 198. The roller 203 is mounted on a pivot member 204 which is carried by the forward side of the main lever 183. It will of course be understood that one or more secondary levers may be mounted on the stationary pivot member 178, it only being necessary to duplicate the construction shown in Figure 22 on the opposite or left side of the main lever 183. The desired rocking movement of the secondary lever 190 is determined by the configuration of the cam track 198.

In the present instance, the cam track 198 is formed at the left end thereof with an arcuate cam portion 205 which extends upwardly and then merges as at 206 in a reversely curved cam portion 207. This latter reversely curved portion 207 provides for the decelerated movement of the secondary lever 190 during the latter part of the rocking movement of the main lever 183. The upwardly curved cam portion 205 provides for the accelerated rocking or movement of the secondary lever 190 during the initial rocking or movement of the main lever 183.

The operation of the modified form of control shown in Figures 21 to 23 inclusive is similar to that in the preferred form in that the main lever 183 at its starting position will be disposed at the extreme left of Figure 21. In this position the secondary lever 190 will have the arm 194 thereof raised and as the main lever is moved to the right, the cam plate 197 will be rocked downwardly, the configuration of the cam portion 205 being such as to provide for rocking of the secondary lever 190 at a speed slightly greater than the rocking or swinging of the main lever 183. When the roller 203 engages in the merging portion 206 between the cam portions 205 and 207, the cam plate 197 will be substantially motionless but when the roller 203 engages in the reversely curved cam portion 207, the cam plate 197 will effect movement of the secondary lever 190 at a speed less than the movement of the main lever 183.

What I claim is:

1. A control device comprising a main lever, a secondary lever, an operator for said secondary lever, latch means connecting said operator with said secondary lever, a bell crank pivotally carried by said main lever, means carried by said bell crank engageable with said operator for moving said operator upon rocking of said bell crank, and stationary cam means engageable with said bell crank to effect rocking of the latter upon movement of said main lever.

2. A control device comprising a main lever, a secondary lever, an operator for said secondary lever, a notched head carried by said operator, a spring-pressed latching dog carried by said secondary lever engageable with the notch of said head, a bell crank pivotally carried by said main lever, means carried by said bell crank engageable with said operator for moving said operator upon rocking of said bell crank, and stationary cam means engageable with said bell crank to effect rocking of the latter upon movement of said main lever.

3. A control device comprising a pair of secondary levers, a main lever, and means correlated with said secondary and main levers providing a differential movement of said secondary levers relative to said main lever, said means including means providing differential movement of one secondary lever relative to the other secondary lever, said first mentioned means also including releasable latching means whereby one secondary lever may be moved independently of the other secondary lever or the main lever.

4. A control device comprising a main rock lever, a secondary rock lever swingable about the pivot of said main lever, and means correlated with both of said levers, providing differential movement of said secondary lever with respect to said main lever, said secondary lever moving in the same direction as and upon movement of said main lever, said levers being initially positioned in substantially side by side relation, said means being so constructed and arranged that said levers will also be positioned in substantially side by side relation at the end of their movement, said means including a stationary cam, a rock member carried by said main lever, means carried by said rock member engaging said cam whereby to rock said rock member upon movement of said main lever, and a second means carried by said rock member operatively connected with said secondary lever whereby rocking of said rock member will also move said secondary lever.

PHILIP M. WAITE.